United States Patent
Azuma et al.

(10) Patent No.: US 10,459,425 B2
(45) Date of Patent: Oct. 29, 2019

(54) NUMERICAL CONTROL DEVICE

(71) Applicant: Mitsubishi Electric Corporation, Chiyoda-ku (JP)

(72) Inventors: Toshihiro Azuma, Tokyo (JP); Kenji Okuma, Tokyo (JP); Junji Matsuno, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 75 days.

(21) Appl. No.: 15/580,407

(22) PCT Filed: Jun. 11, 2015

(86) PCT No.: PCT/JP2015/066850
§ 371 (c)(1),
(2) Date: Dec. 7, 2017

(87) PCT Pub. No.: WO2016/199266
PCT Pub. Date: Dec. 15, 2016

(65) Prior Publication Data
US 2018/0173193 A1    Jun. 21, 2018

(51) Int. Cl.
G05B 19/404    (2006.01)
G05B 19/4093   (2006.01)
G05B 19/4097   (2006.01)

(52) U.S. Cl.
CPC ....... *G05B 19/404* (2013.01); *G05B 19/4093* (2013.01); *G05B 19/4097* (2013.01);
(Continued)

(58) Field of Classification Search
CPC .................................................. G05B 19/404
(Continued)

(56) References Cited

U.S. PATENT DOCUMENTS 4,884,373 A * 12/1989 Suzuki .................. B24B 19/125
                                                        451/5
4,891,763 A *  1/1990 Kuriyama ........ G05B 19/40931
                                                        700/183
(Continued)

FOREIGN PATENT DOCUMENTS

JP          06-274229 A      9/1994
JP       2005-352876 A     12/2005
(Continued)

OTHER PUBLICATIONS

Office Action dated May 6, 2016 in Japanese Application No. 2016-507714 (with partial English translation).
(Continued)

*Primary Examiner* — Thomas C Lee
*Assistant Examiner* — Hawa Z Dirie
(74) *Attorney, Agent, or Firm* — Oblon, McClelland, Maier & Neustadt, L.L.P.

(57) ABSTRACT

A numerical control device includes a tool-attitude vector tolerance input unit to accept a tolerance for correction amounts for tool-attitude vectors; a rotation-axis tolerance determining unit to determine, on the basis of tool attitudes calculated from rotation-axis angles before smoothing and of the tolerance for correction amounts for tool-attitude vectors, a tolerance for correction amounts for the rotation-axis angles; a rotation-axis angle smoothing unit to smooth the rotation-axis angles before smoothing so that change in the rotation-axis angle becomes smooth, thereby calculating rotation-axis angles after smoothing; and a rotation-axis angle determining unit to correct the rotation-axis angles after smoothing so as to fall within the tolerance for correction amounts for rotation-axis angles from the rotation-axis angles before smoothing.

5 Claims, 7 Drawing Sheets

(52) U.S. Cl.
CPC .............. *G05B 2219/34015* (2013.01); *G05B 2219/36403* (2013.01); *G05B 2219/41443* (2013.01); *G05B 2219/50353* (2013.01)

(58) Field of Classification Search
USPC ........................................................ 700/193
See application file for complete search history.

(56) References Cited

U.S. PATENT DOCUMENTS

| | | | | |
|---|---|---|---|---|
| 4,963,805 A * | 10/1990 | Suzuki | ...................... | B24B 5/42 318/569 |
| 4,974,165 A * | 11/1990 | Locke | ................ | G05B 19/4166 318/572 |
| 5,406,494 A * | 4/1995 | Schuett | .................. | G05B 19/41 318/569 |
| 5,503,160 A * | 4/1996 | Pering | .................. | A61B 5/0428 600/508 |
| 5,796,618 A * | 8/1998 | Maeda | ............... | G05B 19/4097 700/104 |
| 6,317,646 B1 * | 11/2001 | de Caussin | ...... | G05B 19/40937 700/173 |
| 6,400,998 B1 * | 6/2002 | Yamazaki | ............ | G05B 19/401 318/568.1 |
| 6,775,586 B2 * | 8/2004 | Shibata | .................. | G05B 19/41 409/183 |
| RE39,907 E * | 11/2007 | Hong | ................... | G05B 19/416 318/571 |
| 8,024,068 B2 * | 9/2011 | Gray | ...................... | B25J 9/1602 382/153 |
| 8,036,770 B2 * | 10/2011 | Ichikawa | ........... | G05B 19/4155 700/159 |
| 9,223,304 B2 | 12/2015 | Otsuki | | |
| 9,651,932 B2 | 5/2017 | Murakami | | |
| 10,018,987 B2 * | 7/2018 | Kanennaru | ............ | G05B 15/02 |
| 2003/0163286 A1 * | 8/2003 | Yasugi | ............ | G05B 19/4065 702/185 |
| 2003/0171842 A1 * | 9/2003 | Teramoto | ........... | G05B 19/4097 700/182 |
| 2007/0046677 A1 * | 3/2007 | Hong | ..................... | G05B 19/41 345/442 |
| 2008/0114485 A1 * | 5/2008 | Katoh | .................. | G05B 19/404 700/193 |
| 2008/0250659 A1 * | 10/2008 | Bellerose | ............. | G05B 19/402 33/1 MP |
| 2009/0157218 A1 * | 6/2009 | Otsuki | .................. | G05B 19/404 700/188 |
| 2011/0224958 A1 * | 9/2011 | Yang | ..................... | G01B 21/042 703/2 |
| 2012/0253505 A1 * | 10/2012 | Matsushita | .......... | G05B 19/401 700/193 |
| 2013/0218323 A1 * | 8/2013 | Otsuki | ................... | G05B 19/19 700/187 |
| 2015/0012127 A1 * | 1/2015 | Murakami | ......... | G05B 19/4083 700/189 |
| 2015/0039122 A1 * | 2/2015 | Barakchi Fard | .... | G06F 17/5009 700/186 |
| 2015/0134103 A1 | 5/2015 | Tsuda et al. | | |
| 2015/0355622 A1 * | 12/2015 | Bretschneider | ...... | G05B 19/182 700/159 |
| 2016/0039014 A1 * | 2/2016 | Uenishi | ..................... | B23C 1/14 700/192 |
| 2016/0349732 A1 * | 12/2016 | Kimata | ................. | G05B 19/404 |
| 2017/0038760 A1 * | 2/2017 | Compagnat | ............. | F01D 5/005 |
| 2017/0355005 A1 * | 12/2017 | Grapsas | ................... | B21D 7/12 |

FOREIGN PATENT DOCUMENTS

| | | |
|---|---|---|
| JP | 2006-268147 A | 10/2006 |
| JP | 3958112 B2 | 8/2007 |
| JP | 2010-146176 A | 7/2010 |
| JP | 2013-058035 A | 3/2013 |
| JP | 2015-015006 A | 1/2015 |
| WO | 2013/175573 A1 | 11/2013 |

OTHER PUBLICATIONS

International Search Report dated Sep. 8, 2015 in PCT/JP2015/066850, filed on Jun. 11, 2015 (English translation thereof).

\* cited by examiner

NUMERICAL CONTROL DEVICE

FIELD

The present invention relates to a numerical control device that controls a machine tool to operate on the basis of a machining program.

BACKGROUND

In creating a machining program to cause a machine tool to operate, CAM (Computer Aided Manufacturing) is often used, but specified positions and attitudes created with the CAM may include a truncation error in convergence calculation or a rounding error due to the limit of the number of output digits. Although the trajectory originally desired to be represented is smooth, because of these errors, the smoothness of the trajectory may be lost when drawn by outputted instructions, or minute back-and-forth movement along a specific axis may occur.

Instructions to produce an unsmooth trajectory as above may cause vibration when the machine operates or scratches in a worked surface. Accordingly, in order to avoid these, functions to smooth instructions in a machining program have conventionally been used. As such a technique, there is a technique described in, e.g., Patent Literature 1.

Patent Literature 1 discloses a technique where instruction data of specified points obtained by approximating a curved line by line segments is smoothed to obtain a curved line, where the specified points are corrected in units smaller than the minimum unit of the instruction data with use of the smoothed curved line and a tolerance amount indicating a set allowable correction amount, where thus the acceleration of a machine tool when driven is made smaller, and where speed is computed using the corrected specified points such that the acceleration of each movement component falls within a prescribed value so as to perform speed control.

CITATION LIST

Patent Literature

Patent Literature 1: Japanese Patent Publication No. 3958112

SUMMARY

Technical Problem

However, in the above conventional technique, the tolerance amount for limiting correction amounts for the specified points is constant, and thus there is the problem that the technique cannot be applied to an axis for which the amount of change in the tool position attitude may be different between before and after correction with the same correction amount being given depending on the current tool position attitude like the rotation axis of a machine tool. That is, there is the problem that, for an axis of which the influence on the tool position attitude changes according to the current state like the rotation axis, specified values cannot be corrected.

The present invention was made in view of the above, and an object thereof is to provide a numerical control device that enables the correction of specified values for an axis of which the influence on the tool position attitude changes.

Solution to Problem

To solve the problems and achieve the object, a numerical control device according to the present invention includes: a tool-attitude vector tolerance input unit to accept a tolerance for correction amounts for tool-attitude vectors; a rotation-axis tolerance determining unit to determine, on the basis of tool attitudes calculated from rotation-axis angles before smoothing and of the tolerance for correction amounts for tool-attitude vectors, a tolerance for correction amounts for the rotation-axis angles; a rotation-axis angle smoothing unit to smooth the rotation-axis angles before smoothing so that change in the rotation-axis angle becomes smooth, thereby calculating rotation-axis angles after smoothing; and a rotation-axis angle determining unit to correct the rotation-axis angles after smoothing so as to fall within the tolerance for correction amounts for rotation-axis angles from the rotation-axis angles before smoothing.

Advantageous Effects of Invention

The numerical control device according to the present invention produces the effect of enabling the correction of specified values for an axis of which the influence on the tool position attitude changes.

DESCRIPTION OF EMBODIMENTS

Numerical control devices according to embodiments of the present invention will be described in detail below with reference to the drawings. Note that these embodiments are not intended to limit the present invention.

First Embodiment

Figure 1:
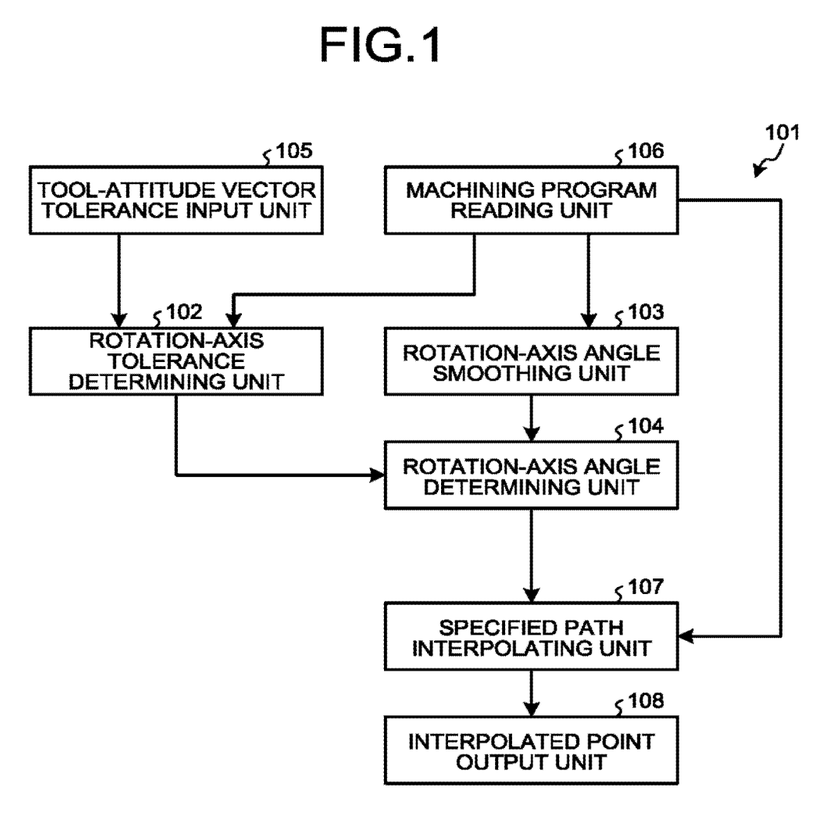
FIG. 1 is a block diagram illustrating the configuration of a numerical control device according to a first embodiment of the present invention.

FIG. 1 is a block diagram illustrating the configuration of a numerical control device 101 according to a first embodiment of the present invention. The numerical control device 101 includes a rotation-axis tolerance determining unit 102 that calculates the tolerance amount of a rotation axis, a rotation-axis angle smoothing unit 103 that performs smoothing so that change in the angle of the rotation axis becomes smooth, and a rotation-axis angle determining unit 104 that corrects rotation-axis angles after smoothing.

The numerical control device 101 further includes a tool-attitude vector tolerance input unit 105 that inputs a tolerance for tool-attitude vector correction amounts to the rotation-axis tolerance determining unit 102, a machining program reading unit 106 that inputs specified values for each axis stated in a machining program to the rotation-axis tolerance determining unit 102 and the rotation-axis angle smoothing unit 103, a specified path interpolating unit 107 that receives the corrected rotation-axis angles to calculate interpolated points for a specified path, and an interpolated point output unit 108 that receives the interpolated points from the specified path interpolating unit 107 to output.

Figure 2:
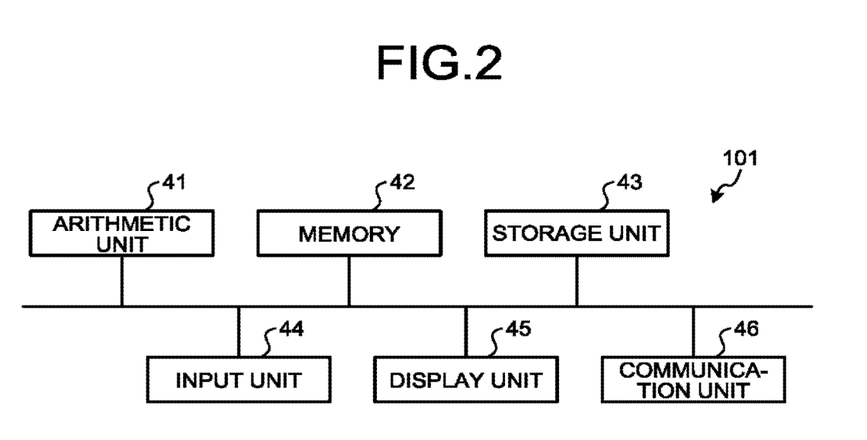
FIG. 2 is a diagram illustrating the hardware configuration of the numerical control device according to the first embodiment.

FIG. 2 is a diagram illustrating the hardware configuration of the numerical control device 101 according to the first embodiment. The numerical control device 101 includes an arithmetic unit 41 such as a CPU (Central Processing Unit) that performs arithmetic processing, a memory 42 used as a work area by the arithmetic unit 41, a storage unit 43 that stores software such as a machining program, an input unit 44 that is an input interface with a user, a display unit 45 that displays information for a user, and a communication unit 46 that has the function of communication with a machine tool. The functions of the numerical control device 101 illustrated in FIG. 1 are realized by the arithmetic unit 41 executing the software.

The rotation-axis tolerance determining unit 102 receives the tolerance for tool-attitude vector correction amounts from the tool-attitude vector tolerance input unit 105 and receives specified values for each axis from the machining program reading unit 106. A method which specifies the angle between vectors before and after correction can be thought of as the method of specifying the tolerance for tool-attitude vector correction amounts, but the specifying method is not limited to this. Then the rotation-axis tolerance determining unit 102 calculates a tolerance for rotation-axis angle correction amounts on the basis of the tolerance for tool-attitude vector correction amounts and the tool attitude calculated from the rotation-axis angle before smoothing that is a specified value for each axis to output to the rotation-axis angle determining unit 104.

The rotation-axis angle smoothing unit 103 receives rotation-axis angles before smoothing that are specified values for each axis from the machining program reading unit 106 to smooth the rotation-axis angles before smoothing so that change in the rotation-axis angle becomes smooth. That is, the rotation-axis angle smoothing unit 103 calculates the rotation-axis angle after smoothing at a point of interest from a specified point sequence in each block stated in a machining program. Then the rotation-axis angle smoothing unit 103 outputs the rotation-axis angles before and after smoothing to the rotation-axis angle determining unit 104. A method which fits a straight line or a curve by least-square approximation or a method which fits a spline curve can be cited as an example of the smoothing method, but the smoothing method is not limited to these.

The rotation-axis angle determining unit 104 receives the tolerance for rotation-axis angle correction amounts from the rotation-axis tolerance determining unit 102 and receives the rotation-axis angles before and after smoothing from the rotation-axis angle smoothing unit 103. The rotation-axis angle determining unit 104 corrects the rotation-axis angle after smoothing so as to fall within the tolerance for rotation-axis angle correction amounts from the rotation-axis angle before smoothing. A method which limits a change amount to within the tolerance for each rotation axis or a method which limits the length of a vector joining points before and after smoothing to within the tolerance while keeping the direction of the vector joining points before and after smoothing in a coordinate space with the rotation axes as its axes can be cited as an example of the correcting method, but the correcting method is not limited to these.

The tool-attitude vector tolerance input unit 105 accepts the tolerance for tool-attitude vector correction amounts from a user to output to the rotation-axis tolerance determining unit 102.

The machining program reading unit 106 reads specified values for each axis from a machining program to output to the rotation-axis tolerance determining unit 102, the rotation-axis angle smoothing unit 103, and the specified path interpolating unit 107.

The specified path interpolating unit 107 receives the corrected rotation-axis angles from the rotation-axis angle determining unit 104 and receives specified values for each axis from the machining program reading unit 106 to calculate interpolated points for a specified path on the basis of tool positions and the corrected rotation-axis angles at periods of instruction to a drive system such as a servo amplifier and to output to the interpolated point output unit 108.

The interpolated point output unit 108 receives interpolated points for the specified path from the specified path interpolating unit 107 to output to the drive system such as a servo amplifier.

Figure 3:
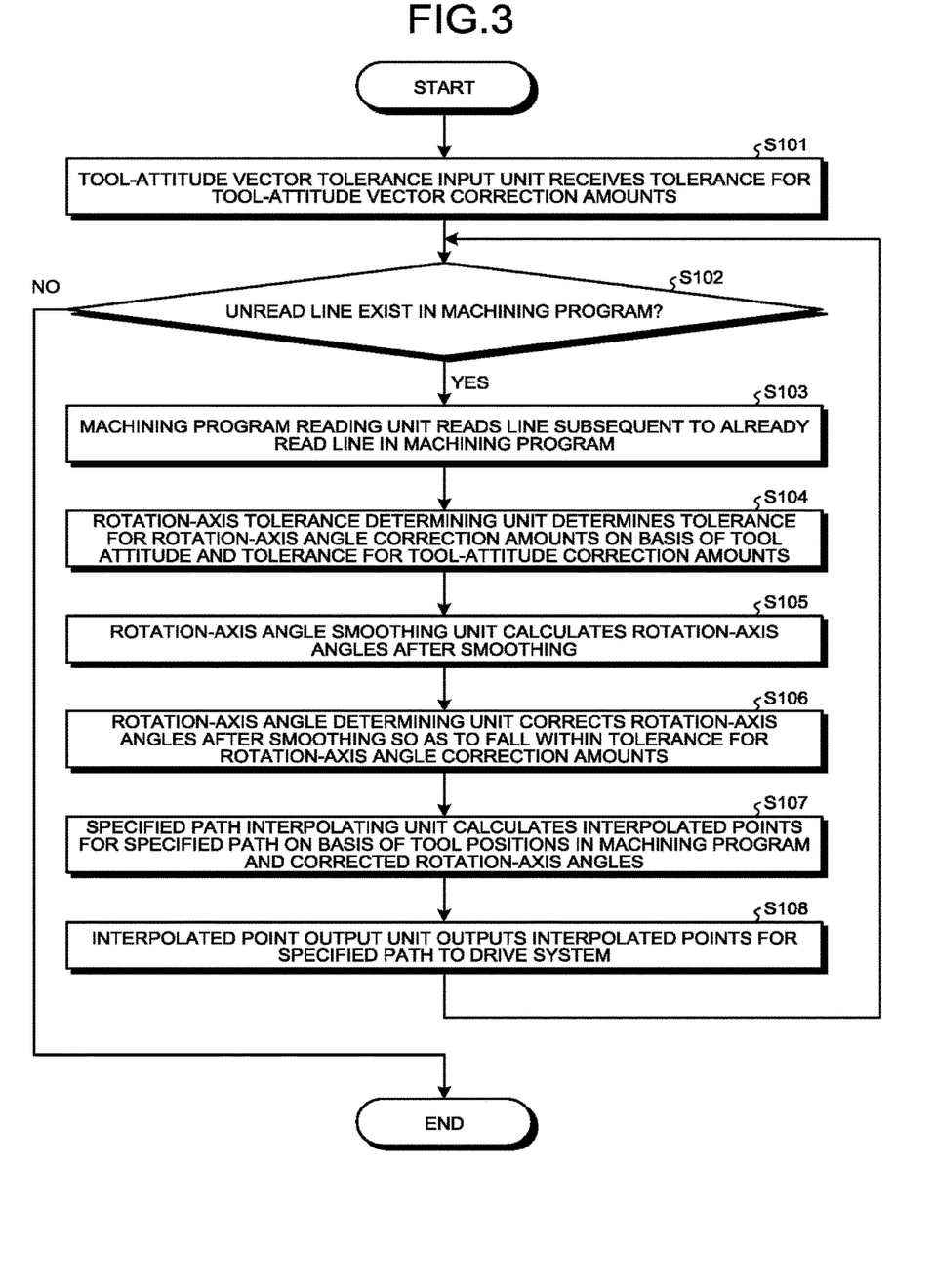
FIG. 3 is a flow chart for explaining the flow of an instruction generating process in the first embodiment.

FIG. 3 is a flow chart for explaining the flow of an instruction generating process in the first embodiment. The flow of the process of correcting rotation-axis angles in the first embodiment will be described in detail with reference to the flow chart illustrated in FIG. 3.

First, the tool-attitude vector tolerance input unit 105 receives the tolerance for tool-attitude vector correction amounts to output to the rotation-axis tolerance determining unit 102 (step S101).

Then the machining program reading unit 106 ascertains whether an unread line exists in the machining program (step S102). When all the lines of the machining program have been read (No at step S102), the entire process ends.

If an unread line exists (Yes at step S102), the process proceeds to step S103, where the machining program reading unit 106 reads the line subsequent to an already read line in the machining program to extract a specified value for each axis (step S103).

Then the rotation-axis tolerance determining unit 102 receives the specified value for each axis from the machining program reading unit 106 and determines the tolerance for rotation-axis angle correction amounts on the basis of a tool attitude calculated from the received specified value for each axis, that is, a rotation-axis angle before smoothing and of the tolerance for tool-attitude correction amounts received from the tool-attitude vector tolerance input unit 105 (step S104).

Then the rotation-axis angle smoothing unit 103 receives the specified values for each axis, that is, rotation-axis angles before smoothing from the machining program reading unit 106 and smooths the rotation-axis angles to obtain rotation-axis angles after smoothing so as to output the rotation-axis angles before and after smoothing to the rotation-axis angle determining unit 104 (step S105).

Then the rotation-axis angle determining unit 104 corrects the rotation-axis angles after smoothing such that the rotation-axis angles after smoothing fall within the tolerance for rotation-axis angle correction amounts from the rotation-axis angles before smoothing (step S106).

Then the specified path interpolating unit 107 receives the corrected rotation-axis angles from the rotation-axis angle determining unit 104 and receives specified values for each axis from the machining program reading unit 106 to calculate interpolated points for a specified path on the basis of tool positions in the machining program and the corrected rotation-axis angles at periods of instruction to a drive system such as a servo amplifier and to output to the interpolated point output unit 108 (step S107).

Then the interpolated point output unit 108 having received the interpolated points for the specified path from the specified path interpolating unit 107, outputs the interpolated points for the specified path to the drive system such as a servo amplifier (step S108), and the process returns to step S102.

The effect produced by the numerical control device 101 according to the first embodiment will be described below.

Figure 4:
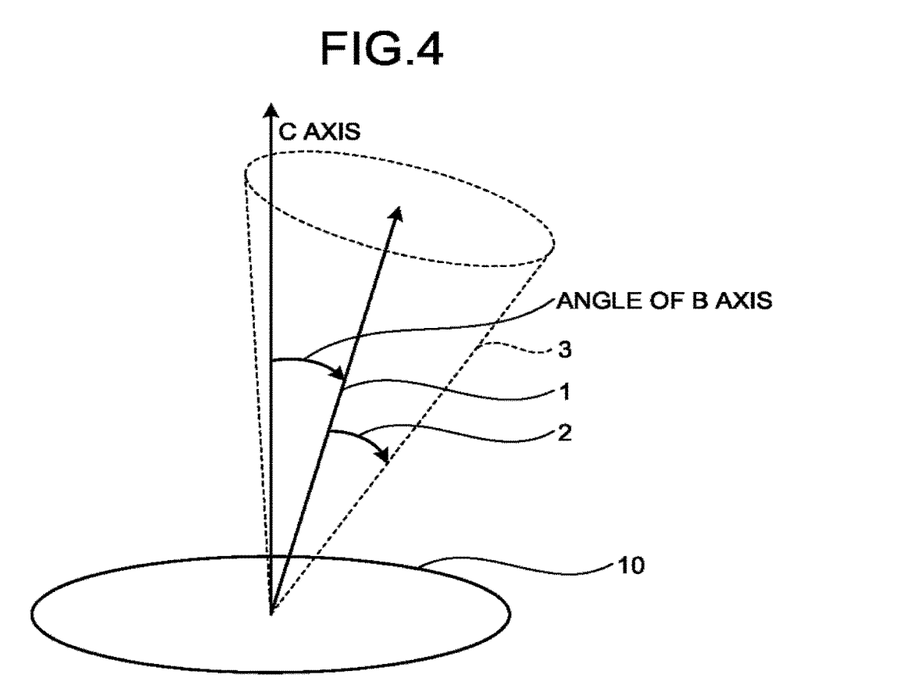
FIG. 4 is a diagram illustrating the relation between a tool-attitude vector and a rotation axis according to the first embodiment.

FIG. 4 is a conceptual diagram illustrating the relation between change in the tool-attitude vector and the rotation axis according to the first embodiment. FIG. 4 illustrates the state where a C axis, a rotation axis, is set perpendicular to a workpiece 10 and where the tool-attitude vector 1 is oriented in the direction leaning at the angle of a B axis relative to the C axis. Although not illustrated, the B axis is set to rotate together with the workpiece 10. Positions to which the tool-attitude vector 1 is displaced by a change angle 2 are indicated by a conical surface 3. The way of setting the B axis and C axis in FIG. 4 is a specific example, but the way of setting is not limited to this.

Figure 5:
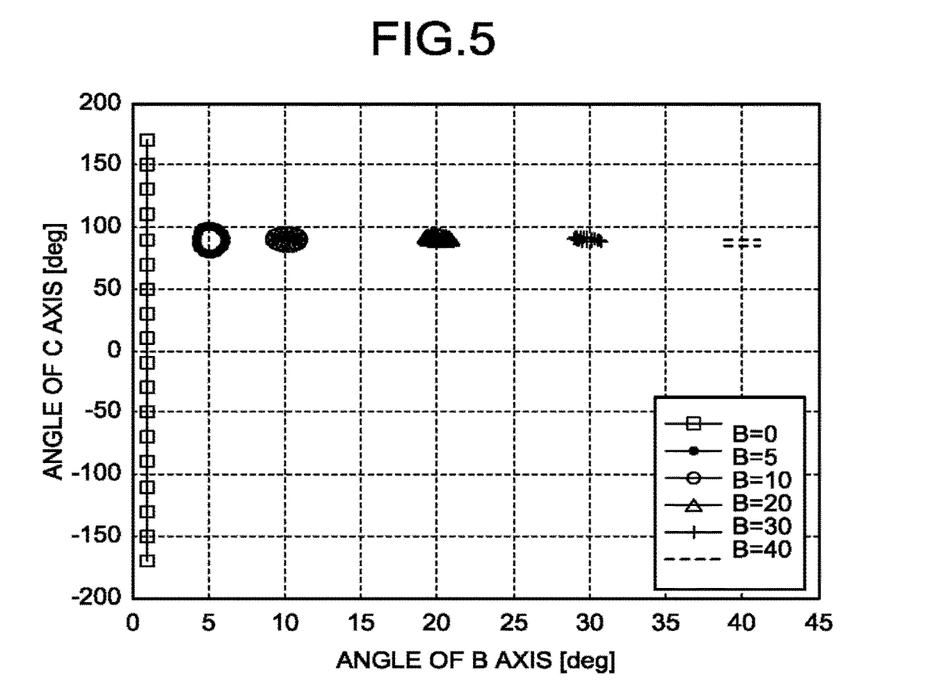
FIG. 5 is a graph of correspondence with the rotation-axis angle when the tool-attitude vector is changed by an amount in the first embodiment.
Figure 6:
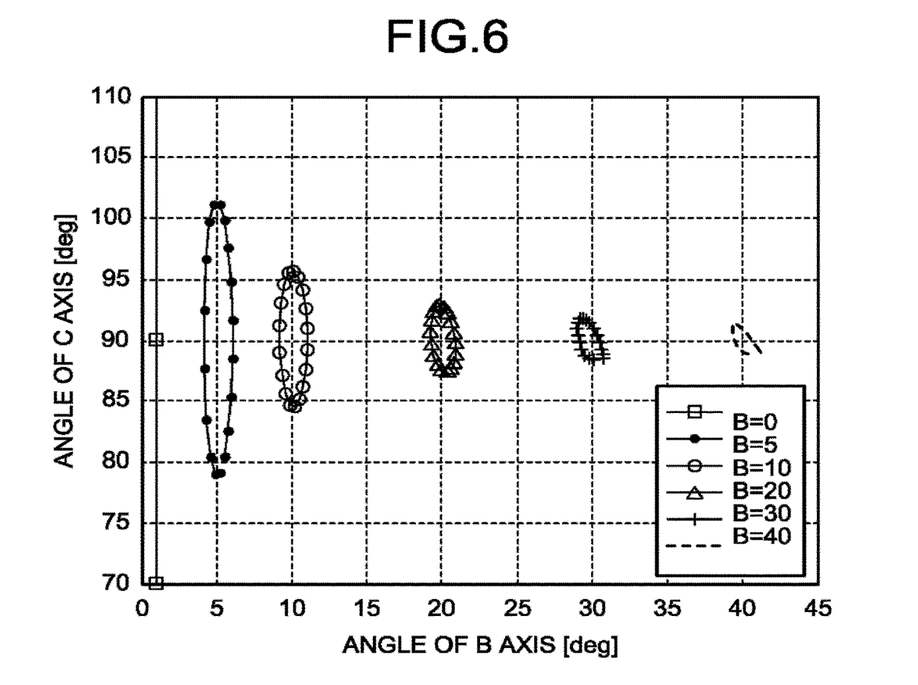
FIG. 6 is an enlarged graph of a part of FIG. 5 in the first embodiment.

FIG. 5 is a graph of correspondence with the rotation-axis angle when the tool-attitude vector is changed by an amount in the first embodiment. FIG. 6 is an enlarged graph of a part of FIG. 5 in the first embodiment. FIGS. 5 and 6 specifically illustrate the relation between the angles of the B axis and of the C axis and tool-attitude vectors on the conical surface 3. FIG. 6 is a graph enlarged in a C axis angle direction of a part in FIG. 5 whose C axis angles are at and close to 90 deg. In FIGS. 5 and 6, for the angle of the tool-attitude vector 1 and the rotation-axis angle, that is, (the B axis angle [deg.], the C axis angle [deg.])=(0 deg., 90 deg.), (5 deg., 90 deg.), (10 deg., 90 deg.), (20 deg., 90 deg.), (30 deg., 90 deg.), and (40 deg., 90 deg.), tool-attitude vectors on the conical surface 3 formed by displacing the tool-attitude vector 1 by the change angle 2 are plotted on a coordinate system with the B axis angle and the C axis angle as its axes. In FIGS. 5 and 6, it is supposed that the change angle 2 is 1 deg., but it is seen that, as the B axis angle becomes smaller, the tool attitude comes close to a singular attitude and that hence the influence on the rotation-axis angle, that is, the C axis angle is large even with the change angle 2, a tool attitude change amount, being the same.

Figure 7:
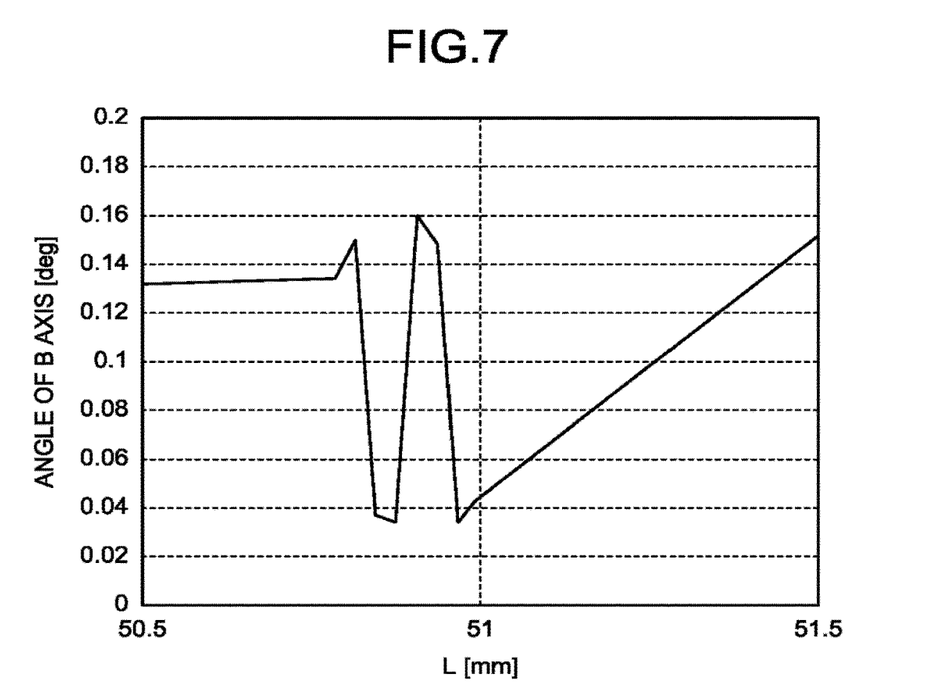
FIG. 7 is a graph illustrating change in the rotation-axis angle when operating according to a machining program without applying the tolerance for the rotation axis dependent on the tool attitude according to the first embodiment.
Figure 8:
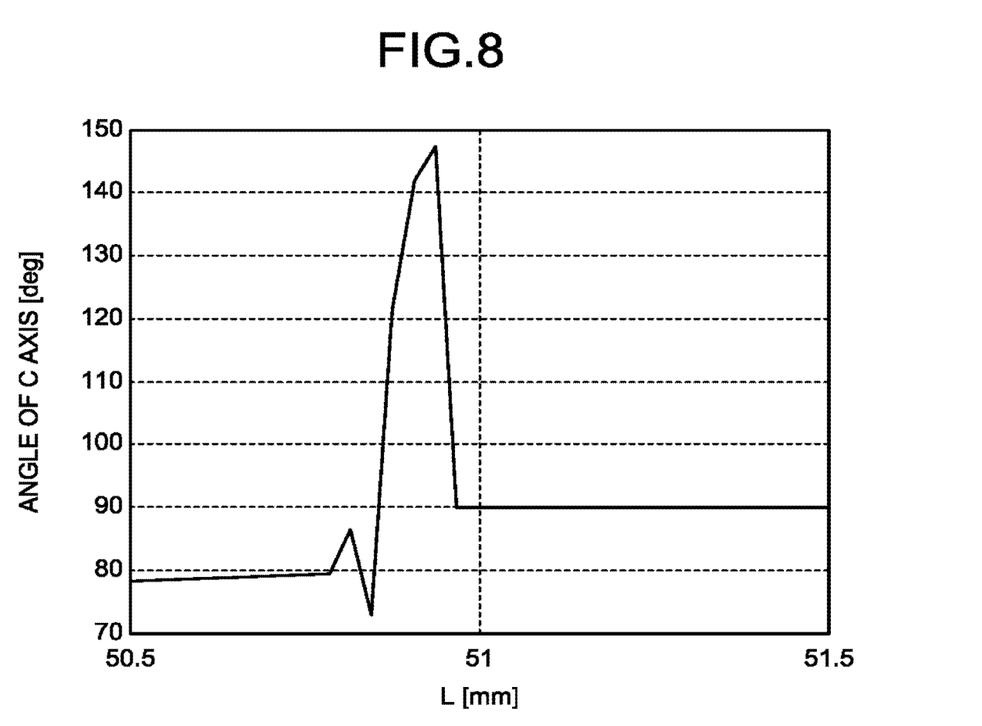
FIG. 8 is a graph illustrating change in the rotation-axis angle when operating according to the machining program without applying the tolerance for the rotation axis dependent on the tool attitude according to the first embodiment.

FIGS. 7 and 8 are graphs illustrating change in the rotation-axis angle when operating according to a machining program without applying the tolerance for the rotation axis dependent on the tool attitude according to the first embodiment. In FIG. 7, the horizontal axis represents a movement amount L [mm] of the tool tip, and the vertical axis represents the B axis angle [deg.]. In FIG. 8, the horizontal axis represents the movement amount L [mm] of the tool tip, and the vertical axis represents the C axis angle [deg.]. In FIGS. 7 and 8, a place where an unnecessary axis inversion occurs due to an instruction in the machining program is indicated.

The graphs illustrated in FIGS. 7 and 8 show a place excerpted from a machining program where an unnecessary axis inversion of the rotation axis occurs. Because the B axis angle is close to 0 deg., it is thought that the influence of a large change in the C axis angle on the tool attitude is small and that thus an unnecessary axis movement and axis inversion occur. The reason why such a program is created by the CAM is thought to be that, even if a change in the tool attitude is minute in calculating the tool attitude, a change in the C axis angle corresponding to a change in the tool attitude is large as illustrated in FIGS. 5 and 6.

If such a machining program is executed as it is, a change in the C axis angle is large, so that a change in speed due to acceleration/deceleration is large and that scratches or the like may occur in a finished surface. Further, various problems, such as the machining time lengthening by a wait time in acceleration/deceleration, occur.

The numerical control device 101 according to the first embodiment, when smoothing rotation-axis angles, determines the tolerance for rotation-axis angle correction amounts such that tool-attitude vector correction amounts fall within a given tolerance and corrects the rotation-axis angles. That is, the numerical control device 101 calculates the tolerance for rotation-axis angle correction amounts such that tool-attitude change amounts are the same and smooths rotation-axis angles by correction amounts within that tolerance.

Thus, it becomes possible to correct specified values for an axis of which the influence on the position and attitude of the tool changes. As a result, at a place where the influence on the tool attitude is small as in the case where the value of the B axis angle is small of the above example, correction amounts for the angle of the C axis that is the rotation axis can be made larger, so that unnecessary inversion or change of the rotation-axis angle can be suppressed. In addition, at a place where the influence on the tool attitude is large as in the case where the value of the B axis angle is large, by limiting correction amounts for the angle of the C axis that is the rotation axis to small amounts, excessive correction of the rotation-axis angle is prevented, so that deviation from the path intended by a user can be suppressed.

Or in the rotation-axis smoothing at S105 of the first embodiment, specified angle values for which the tolerance for rotation-axis angle correction amounts is greater than or equal to a predetermined value may be excluded from reference points to perform smoothing. In the case of specified values for which the tolerance for rotation-axis angle correction amounts is large, since the influence of change in the rotation-axis angle on the tool attitude is small, the angle may be greatly inverted by a slight change in the tool attitude when the CAM has generated specified values in a machining program. Thus, the possibility becomes high that, rather than the specified value at a place where the tolerance for rotation-axis angle correction amounts is greater than or equal to a predetermined value, specified values before and after that specified value may have meaningful information. Therefore, by performing smoothing with such a specified value for the angle being excluded, smoothing can be more efficiently performed in the case where unnecessary inversion or change of the rotation axis occurs at a place where the influence on the tool attitude is small.

Second Embodiment

Figure 9:
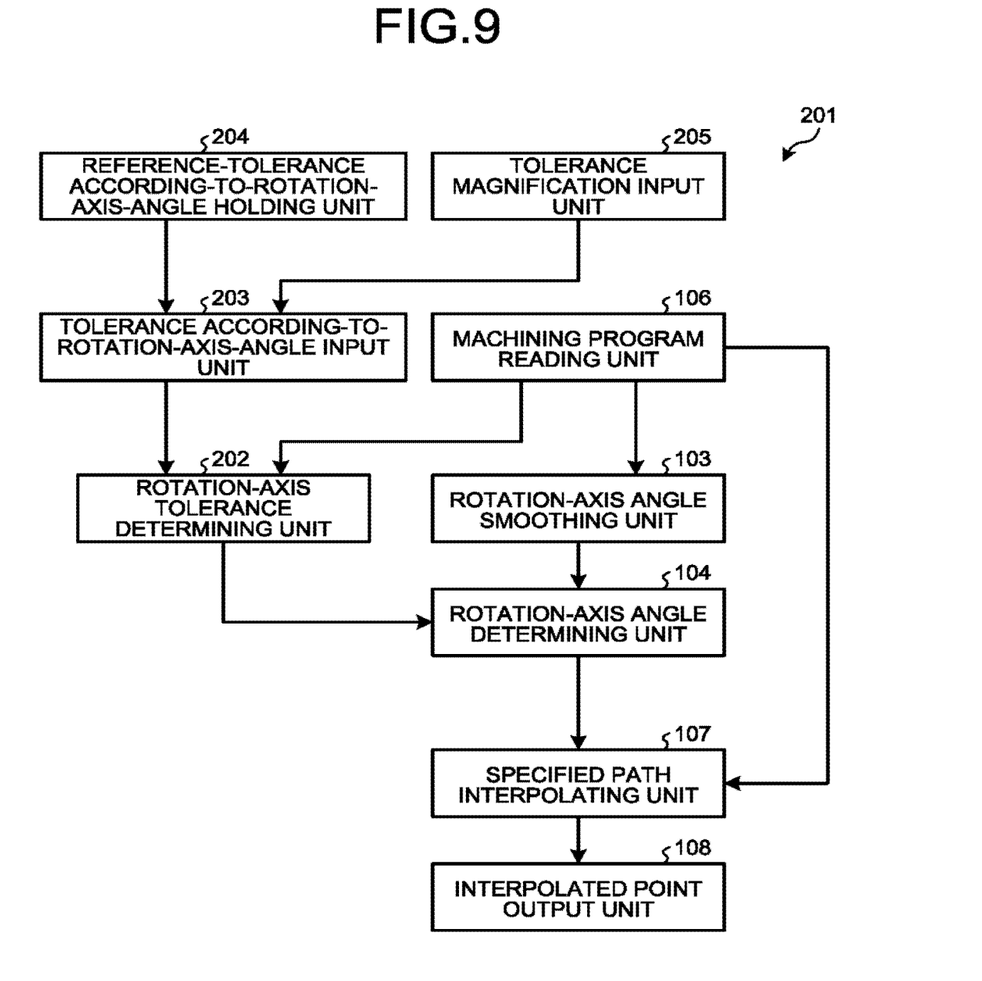
FIG. 9 is a block diagram illustrating the configuration of a numerical control device according to a second embodiment of the present invention.

FIG. 9 is a block diagram illustrating the configuration of a numerical control device 201 according to a second embodiment of the present invention. The numerical control device 201 includes a rotation-axis tolerance determining unit 202 that calculates the tolerance amount of a rotation axis, a rotation-axis angle smoothing unit 103 that performs smoothing so that change in the angle of the rotation axis becomes smooth, and a rotation-axis angle determining unit 104 that corrects rotation-axis angles after smoothing.

The numerical control device 201 further includes a reference-tolerance according-to-the-rotation-axis-angle holding unit 204 that holds a reference tolerance that is a reference value for the tolerance amount of a rotation axis according to the angle of the rotation axis, a tolerance magnification input unit 205 that accepts a tolerance magnification for the reference tolerance from a user, a tolerance according-to-the-rotation-axis-angle input unit 203 that obtains a tolerance according to the rotation-axis angle, a machining program reading unit 106 that inputs specified values for each axis stated in a machining program to the rotation-axis tolerance determining unit 202 and the rotation-axis angle smoothing unit 103, a specified path interpolating unit 107 that receives the corrected rotation-axis angles to calculate interpolated points for a specified path, and an interpolated point output unit 108 that receives the interpolated points from the specified path interpolating unit 107 to output.

The hardware configuration of the numerical control device 201 is the same as is illustrated in FIG. 2, and the functions of the numerical control device 201 illustrated in FIG. 9 except the reference-tolerance according-to-the-rotation-axis-angle holding unit 204 are realized by the arithmetic unit 41 executing software. The function of the reference-tolerance according-to-the-rotation-axis-angle holding unit 204 is realized by the memory 42 or the storage unit 43.

The rotation-axis tolerance determining unit 202 receives the tolerance according to the rotation-axis angle from the tolerance according-to-the-rotation-axis-angle input unit 203 and receives a rotation-axis angle before smoothing that is a specified value for each rotation axis from the machining program reading unit 106. Then the rotation-axis tolerance determining unit 202 calculates a tolerance for rotation-axis angle correction amounts for the current value of the rotation-axis angle on the basis of the tolerance according to the rotation-axis angle and the rotation-axis angle before smoothing to output to the rotation-axis angle determining unit 104.

The function of the rotation-axis angle smoothing unit 103 is the same as is described in the first embodiment.

The rotation-axis angle determining unit 104 receives the tolerance for the rotation axis from the rotation-axis tolerance determining unit 202 and receives rotation-axis angles before and after smoothing from the rotation-axis angle smoothing unit 103. The function of the rotation-axis angle determining unit 104 is the same as is described in the first embodiment.

The reference-tolerance according-to-the-rotation-axis-angle holding unit 204 holds a reference tolerance that is a reference value for the tolerance amount of the rotation axis according to the angle of the rotation axis to output to the rotation-axis angle from the tolerance according-to-the-rotation-axis-angle input unit 203. Since the reference-tolerance according-to-the-rotation-axis-angle holding unit 204 holds the reference tolerance beforehand, the setting is easy without labor of input by a user.

The tolerance magnification input unit 205 accepts a tolerance magnification for the reference tolerance from a user to output to the tolerance according-to-the-rotation-axis-angle input unit 203.

The tolerance according-to-the-rotation-axis-angle input unit 203 receives the reference tolerance from the reference-tolerance according-to-the-rotation-axis-angle holding unit 204 and receives the tolerance magnification for the reference tolerance from the tolerance magnification input unit 205. The tolerance according-to-the-rotation-axis-angle input unit 203 calculates the reference tolerance multiplied by the tolerance magnification as the tolerance according to the rotation-axis angle to output the tolerance according to the rotation-axis angle to the rotation-axis tolerance determining unit 202.

If there are a plurality of rotation axes a, b, and c, the tolerance according to the rotation-axis angle may refer to the tolerance for the rotation axis a according to the value of the rotation axis a, but may refer to the tolerance for the other rotation axis b or c according to the value of the rotation axis a. A method which represents a tolerance for each angle range having the same width in the form of a tolerance table or a method which represents in the form of an expression with the rotation-axis angle as a parameter can be thought of as the method of representing the tolerance according to the rotation-axis angle, but the representing method is not limited to these.

The machining program reading unit 106 reads specified values for each axis from a machining program to output to the rotation-axis tolerance determining unit 202, the rotation-axis angle smoothing unit 103, and the specified path interpolating unit 107.

The functions of the specified path interpolating unit 107 and of the interpolated point output unit 108 are the same as are described in the first embodiment.

Figure 10:
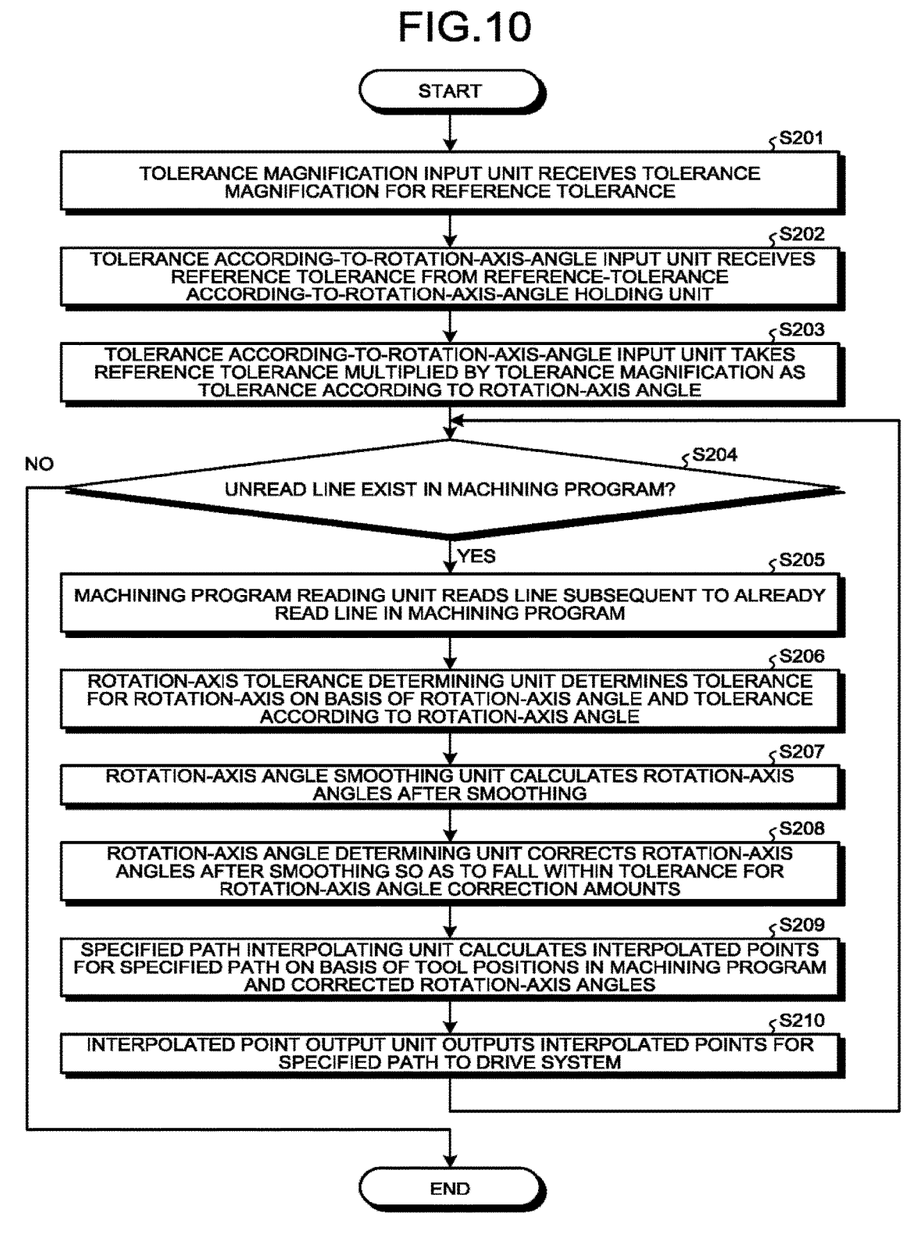
FIG. 10 is a flow chart for explaining the flow of the instruction generating process in the second embodiment.

FIG. 10 is a flow chart for explaining the flow of the instruction generating process in the second embodiment. The flow of the process of correcting rotation-axis angles in the second embodiment will be described in detail with reference to the flow chart illustrated in FIG. 10.

First, the tolerance magnification input unit 205 receives a tolerance magnification for the reference tolerance for each rotation-axis angle (step S201).

Then the tolerance according-to-the-rotation-axis-angle input unit 203 receives the reference tolerance according to the rotation-axis angle from the reference-tolerance according-to-the-rotation-axis-angle holding unit 204 (step S202), receives the tolerance magnification from the tolerance magnification input unit 205, and takes the reference tolerance multiplied by the tolerance magnification as the tolerance according to the rotation-axis angle (step S203). Then the tolerance according-to-the-rotation-axis-angle input unit 203 outputs the tolerance according to the rotation-axis angle to the rotation-axis tolerance determining unit 202.

Then the machining program reading unit 106 ascertains whether an unread line exists in the machining program (step S204). When all the lines of the machining program have been read (No at step S204), the entire process ends.

If an unread line exists (Yes at step S204), the process proceeds to step S205, where the machining program reading unit 106 reads the line subsequent to an already read line in the machining program to extract a specified value for each axis (step S205).

Then the rotation-axis tolerance determining unit 202 receives the specified value for each axis from the machining program reading unit 106 and determines the tolerance for a rotation axis on the basis of a rotation-axis angle obtained from the received specified value for each axis and of the tolerance according to the rotation-axis angle (step S206).

Then the rotation-axis angle smoothing unit 103 receives specified values for each axis from the machining program reading unit 106 and smooths the rotation-axis angles to obtain rotation-axis angles after smoothing so as to output the rotation-axis angles before and after smoothing to the rotation-axis angle determining unit 104 (step S207).

Then the rotation-axis angle determining unit 104 corrects the rotation-axis angles after smoothing such that the rotation-axis angles after smoothing fall within the tolerance for rotation-axis angle correction amounts from the rotation-axis angles before smoothing (step S208).

Then the specified path interpolating unit 107 receives the corrected rotation-axis angles from the rotation-axis angle determining unit 104 and receives specified values for each axis from the machining program reading unit 106 to calculate interpolated points for a specified path on the basis of tool positions in the machining program and the corrected rotation-axis angles at periods of instruction to a drive system such as a servo amplifier and to output to the interpolated point output unit 108 (step S209).

Then the interpolated point output unit 108 having received the interpolated points for the specified path from the specified path interpolating unit 107, outputs the interpolated points for the specified path to the drive system such as a servo amplifier (step S210), and the process returns to step S204.

As described above, the numerical control device 201 according to the second embodiment changes rotation-axis angle correction amounts on the basis of the tolerance according to the rotation-axis angle in smoothing rotation-axis angles, unlike that of the first embodiment. Also by this approach, it becomes possible to correct specified values for an axis of which the influence on the position and attitude of the tool changes. As a result, at a place where the influence on the tool attitude is small as in the case described in the first embodiment where the value of the B axis angle is small, correction amounts for the angle of the C axis that is the rotation axis can be made larger, so that unnecessary inversion or change of the rotation-axis angle can be suppressed. In addition, at a place where the influence on the tool attitude is large as in the case where the value of the B axis angle is large, by limiting correction amounts for the angle of the C axis that is the rotation axis to small amounts, excessive correction of the rotation-axis angle is prevented, so that deviation from the path intended by a user can be suppressed.

Or in the rotation-axis smoothing at S207 of the second embodiment, specified angle values for which the tolerance for rotation-axis angle correction amounts is greater than or equal to a predetermined value may be excluded from reference points to perform smoothing.

The configuration shown in the above embodiments is illustrative of the content of the present invention and can be combined with other publicly known techniques, and also part of the configuration can be omitted or changed without departing from the spirit of the present invention.

REFERENCE SIGNS LIST

1 tool-attitude vector, 2 change angle, 3 conical surface, 10 workpiece, 41 arithmetic unit, 42 memory, 43 storage unit, 44 input unit, 45 display unit, 46 communication unit, 101 and 201 numerical control device, 102 and 202 rotation-axis tolerance determining unit, 103 rotation-axis angle smoothing unit, 104 rotation-axis angle determining unit, 105 tool-attitude vector tolerance input unit, 106 machining program reading unit, 107 specified path interpolating unit, 108 interpolated point output unit, 203 tolerance according-to-the-rotation-axis-angle input unit, 204 reference-tolerance according-to-the-rotation-axis-angle holding unit, 205 tolerance magnification input unit.

The invention claimed is:

1. A numerical control device comprising:
processing circuitry configured to
accept a tolerance for correction amounts for tool-attitude vectors;
determine, on the basis of tool attitudes calculated from rotation-axis angles before smoothing and of the tolerance for correction amounts for tool-attitude vectors, a tolerance for correction amounts for the rotation-axis angles;
smooth the rotation-axis angles before smoothing so that change in the rotation-axis angle becomes smooth, thereby calculating rotation-axis angles after smoothing; and
correct the rotation-axis angles after smoothing so as to fall within the tolerance for correction amounts for rotation-axis angles from the rotation-axis angles before smoothing.

2. A numerical control device comprising:
processing circuitry configured to
calculate a tolerance according to a rotation-axis angle on the basis of a reference tolerance according to the rotation-axis angle and of a tolerance magnification;
determine, on the basis of the tolerance according to the rotation-axis angle and rotation-axis angles before smoothing, a tolerance for correction amounts for the rotation-axis angles;
smooth the rotation-axis angles before smoothing so that change in the rotation-axis angle becomes smooth, thereby calculating rotation-axis angles after smoothing; and
correct the rotation-axis angle after smoothing so as to fall within the tolerance for correction amounts for rotation-axis angles from the rotation-axis angles before smoothing, wherein the processing circuitry performs smoothing with specified angle values for which the tolerance for rotation-axis angle correction amounts is greater than or equal to a predetermined value being excluded.

3. The numerical control device according to claim 2, wherein the processing circuitry is further configured to hold the reference tolerance; and
accept a tolerance magnification for the reference tolerance,
wherein the reference tolerance multiplied by the tolerance magnification is taken as the tolerance according to the rotation-axis angle.

4. The numerical control device according to claim 1, wherein the processing circuitry performs smoothing with specified angle values for which the tolerance for rotation-axis angle correction amounts is greater than or equal to a predetermined value being excluded.

5. A method, implemented on a numerical control device, comprising:
accepting a tolerance for correction amounts for tool-attitude vectors;
determining, on the basis of tool attitudes calculated from rotation-axis angles before smoothing and of the tolerance for correction amounts for tool-attitude vectors, a tolerance for correction amounts for the rotation-axis angles;

smoothing the rotation-axis angles before smoothing so that change in the rotation-axis angle becomes smooth, thereby calculating rotation-axis angles after smoothing; and correcting the rotation-axis angles after smoothing so as to fall within the tolerance for correction amounts for rotation-axis angles from the rotation-axis angles before smoothing.

\* \* \* \* \*